(12) United States Patent
Khan et al.

(10) Patent No.: US 10,570,965 B2
(45) Date of Patent: Feb. 25, 2020

(54) UNIVERSAL JOINT BEARING

(71) Applicant: Aktiebolaget SKF, Gothenburg (SE)

(72) Inventors: Suhel Ahamad Khan, Jabalpur (IN);
Helmut Hauck, Euerbach (DE);
Hubert Herbst, Gädheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/973,830

(22) Filed: May 8, 2018

(65) Prior Publication Data
US 2018/0340576 A1  Nov. 29, 2018

(30) Foreign Application Priority Data
May 23, 2017 (IN) .............................. 201741018007

(51) Int. Cl.
*F16C 33/78* (2006.01)
*F16D 3/38* (2006.01)
*F16D 3/40* (2006.01)
*F16C 21/00* (2006.01)
*F16C 33/80* (2006.01)
*F16J 15/3268* (2016.01)

(52) U.S. Cl.
CPC ............ *F16D 3/385* (2013.01); *F16C 21/005* (2013.01); *F16C 33/7823* (2013.01); *F16C 33/7826* (2013.01); *F16C 33/7876* (2013.01); *F16C 33/7886* (2013.01); *F16C 33/805* (2013.01); *F16D 3/40* (2013.01); *F16J 15/3268* (2013.01); *F16C 2361/41* (2013.01); *F16D 2300/08* (2013.01)

(58) Field of Classification Search
CPC ................ F16C 33/805; F16C 33/7886; F16C 33/7809; F16C 33/7823; F16C 21/005; F16C 25/08; F16C 33/7826; F16C 2361/41; F16C 2360/08; F16D 3/385; F16D 3/40; F16D 3/42; F16J 15/3268
USPC ................ 384/477, 480, 486–487, 548, 586; 464/131, 133; 277/353, 402, 549, 563
See application file for complete search history.

(56) References Cited

U.S. PATENT DOCUMENTS

| | | | | | |
|---|---|---|---|---|---|
| 4,512,672 | A | * | 4/1985 | Olschewski | .......... F16C 21/005 277/402 |
| 4,576,382 | A | * | 3/1986 | Scharting | ............ F16C 33/7809 277/353 |
| 4,645,474 | A | * | 2/1987 | Olschewski | .......... F16C 21/005 277/402 |
| 4,806,026 | A | * | 2/1989 | Bauer | ................. F16C 33/7809 277/353 |

(Continued)

FOREIGN PATENT DOCUMENTS

| CN | 100588850 C | 2/2010 |
|---|---|---|
| CN | 105317847 A | 2/2016 |

(Continued)

*Primary Examiner* — Marcus Charles
(74) *Attorney, Agent, or Firm* — Garcia-Zamor Intellectual Property Law, LLC; Ruy Garcia-Zamor; Bryan Peckjian

(57) ABSTRACT

A universal joint bearing with at least a first and a second elastomeric ring. The universal joint bearing is free from spiral springs, which exert a force on a portion of one of the elastomeric rings. The portion is provided for abutting against a trunnion of a crosspiece of a universal joint in a condition in which the universal joint bearing is part of the universal joint.

10 Claims, 5 Drawing Sheets

(56) References Cited

U.S. PATENT DOCUMENTS

| | | | | |
|---|---|---|---|---|
| 5,026,324 A | * | 6/1991 | Schurger | F16C 33/7809 |
| | | | | 277/551 |
| 5,769,723 A | * | 6/1998 | Faulbecker | F16C 33/7809 |
| | | | | 277/300 |
| 6,050,571 A | * | 4/2000 | Rieder | F16C 21/005 |
| | | | | 277/353 |
| 6,183,369 B1 | * | 2/2001 | Faulbecker | F16D 3/385 |
| | | | | 277/352 |
| 7,258,490 B2 | * | 8/2007 | Peschke | F16C 21/005 |
| | | | | 384/485 |
| 8,939,844 B2 | * | 1/2015 | Higuchi | F16D 3/385 |
| | | | | 277/321 |
| 2004/0224779 A1 | * | 11/2004 | Menosky | F16C 21/005 |
| | | | | 464/178 |

FOREIGN PATENT DOCUMENTS

| | | | | |
|---|---|---|---|---|
| DE | 4128179 A1 | * | 2/1993 | F16C 21/005 |
| DE | 4128179 A1 | | 2/1993 | |
| DE | 19701461 A1 | * | 7/1998 | F16C 21/005 |
| DE | 19701461 A1 | | 7/1998 | |
| DE | 102014215000 A1 | | 2/2016 | |
| JP | 08100820 A | * | 4/1996 | |
| JP | H08100820 A | | 4/1996 | |
| JP | 09151956 A | * | 6/1997 | F16D 3/41 |
| JP | H09151956 A | | 6/1997 | |

* cited by examiner

UNIVERSAL JOINT BEARING

CROSS-REFERENCE TO RELATED APPLICATIONS

This application claims priority to Indian patent application no. 201741018007 filed on May 23, 2017, the contents of which are fully incorporated herein by reference.

TECHNICAL FIELD OF THE INVENTION

The invention concerns a universal joint bearing.

BACKGROUND OF THE PRESENT INVENTION

From DE 10 2014 215 000 A1 a universal joint bearing is known with a sealing which comprises a spiral spring.

BRIEF SUMMARY OF THE PRESENT INVENTION

The object of the invention is, in particular, to provide a universal joint bearing which is very efficient.

The invention starts from an universal joint bearing comprising at least a first and a second elastomeric ring.

It is suggested that the universal joint bearing is free from spiral springs, which exert a force on a portion of one of the elastomeric rings, wherein the portion is provided for abutting against a trunnion of a crosspiece of a universal joint in a condition in which the universal joint bearing is part of the universal joint. A "universal joint bearing" is in particular a part of a universal joint which comprises at least a cup and rolling elements, but which comprises no trunnion. According to the invention a very efficient universal joint bearing is achieved. In particular a very effective and cost efficient sealing of the universal joint bearing is accomplished. Furthermore, in particular a protection of the universal joint bearing from heavy mud and dust under extreme conditions is achieved.

Furthermore, a universal joint bearing with at least a first and a second elastomeric ring and a cup is suggested, wherein one of the elastomeric rings comprises at least two sealing lips which abut against the cup, in particular against an radially outer surface of the cup. According to the invention a very efficient universal joint bearing is achieved. In particular a very effective and cost efficient sealing of the universal joint bearing is accomplished.

BRIEF DESCRIPTION OF THE DRAWINGS

Further advantages result from the following drawing description. Embodiments of the invention are shown in the drawings. The drawings, the description and the claims contain numerous features in combination. The person skilled in the art will expediently also consider the features individually and combine them into meaningful further combinations.

DETAILED DESCRIPTION OF THE PRESENT INVENTION

Figure 1:
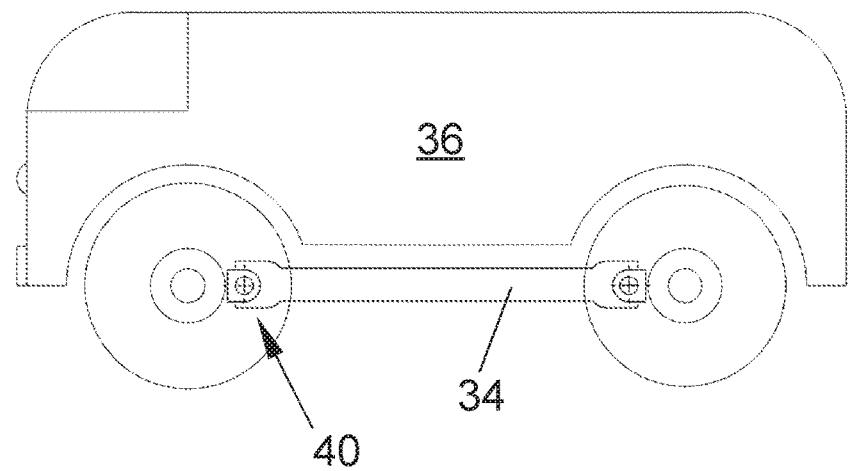
FIG. 1 presents a motor vehicle comprising a universal joint with an universal joint bearing according to the invention.
Figure 2:
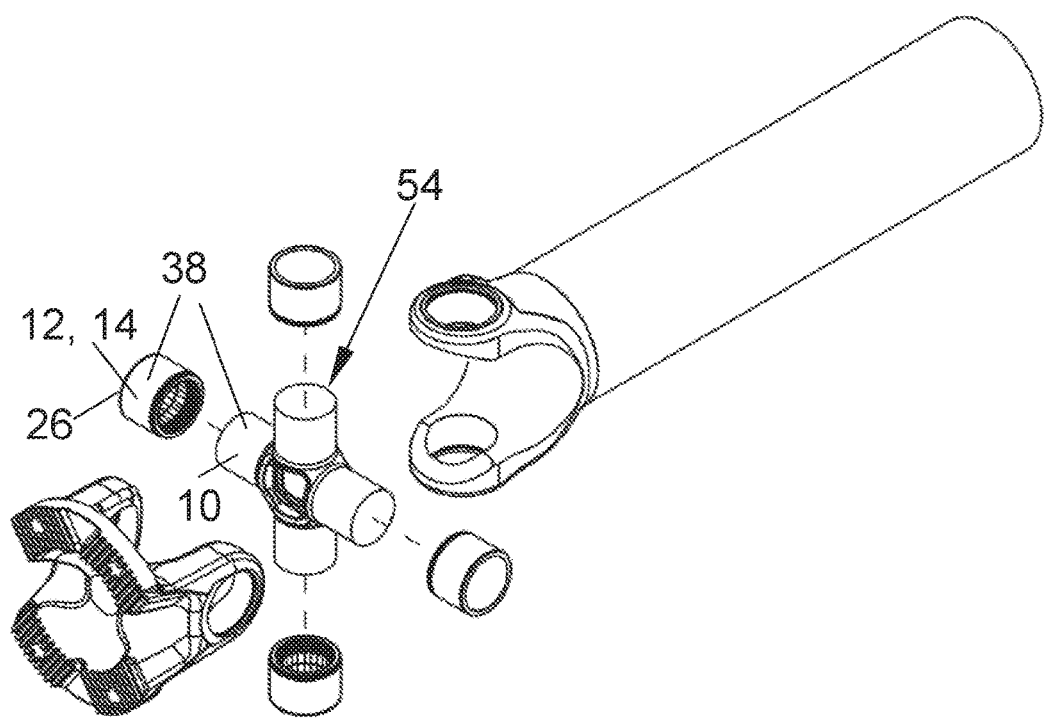
FIG. 2 presents the universal joint in an explosion view.
Figure 3:
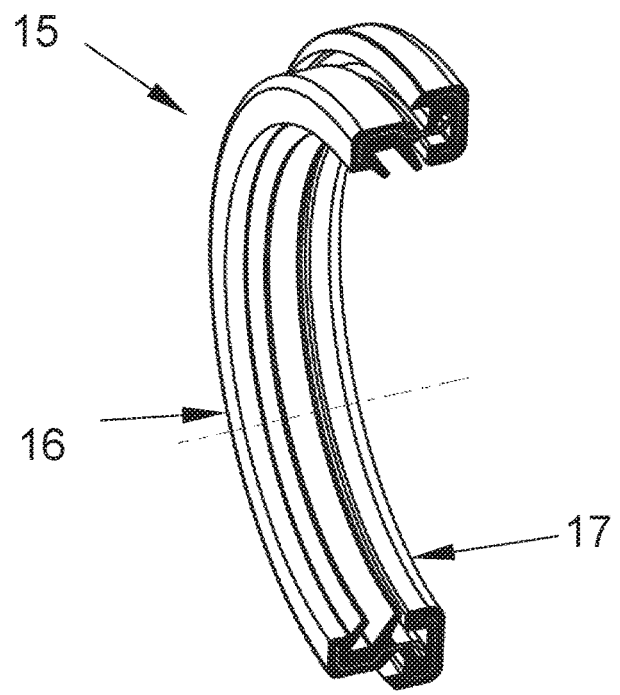
FIG. 3 presents a section through a sealing of the universal joint bearing.
Figure 4:
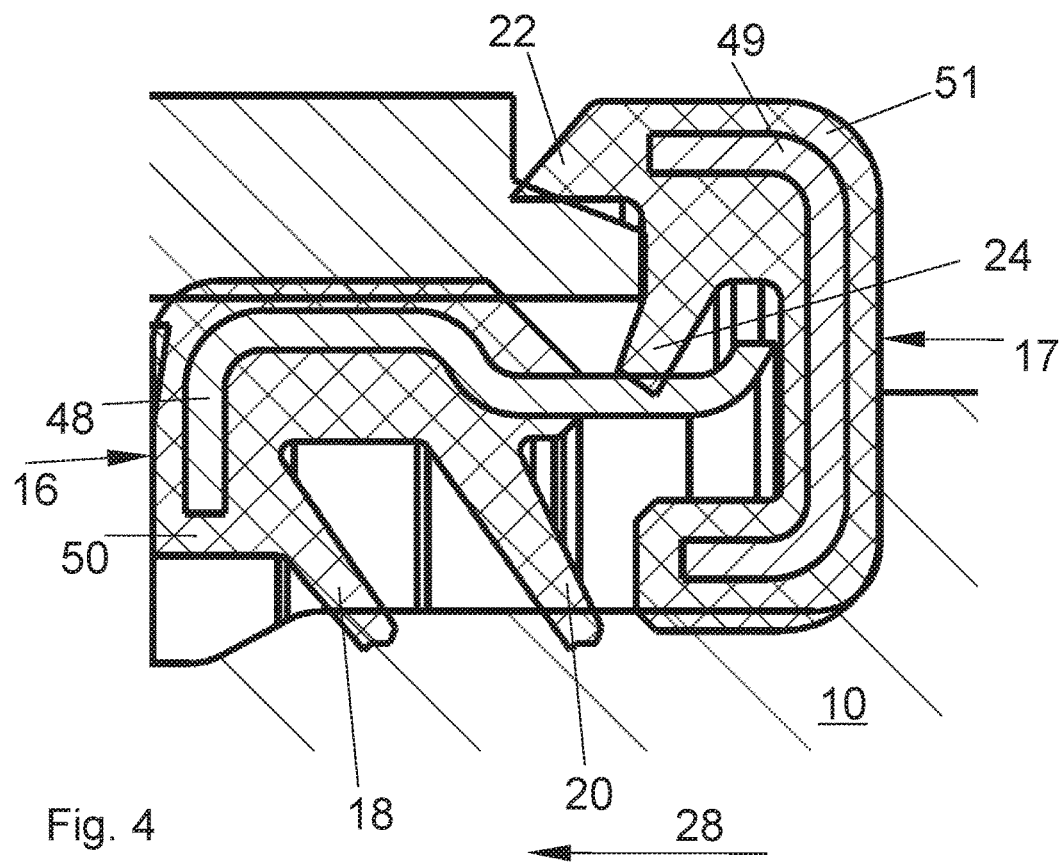
FIG. 4 presents a part of a section through the universal joint bearing and a trunnion.

FIG. 1 shows a motor vehicle 36 comprising a universal joint 40 with a universal joint bearing arrangement. The universal joint bearing arrangement possesses a universal joint bearing 38 according to the invention and a crosspiece 54 of the universal joint (FIGS. 2 to 4). The motor vehicle is a truck. The universal joint is connected to a propeller shaft 34 of the truck. A trunnion 10 of the crosspiece serves as an inner ring for the universal joint bearing 38. Furthermore, the universal joint bearing 38 comprises a cup 12, which serves as an outer ring 14 of the universal joint bearing 38. The universal joint bearing 38 has a seal 15, which seals a gap 18 between the cup 12 and the trunnion 10. The universal joint bearing 38 and the seal 15 are free from spiral springs. Furthermore, the universal joint bearing arrangement is free from spiral springs. The seal 15 consists of a first sealing ring 16 and a second sealing ring 17. The first sealing ring 16 comprises a first reinforcement ring 48 and a first elastomeric ring 50. It is force-fitly fixed to the cup 12. The second sealing ring 17 comprises a metal ring 49 and a second elastomeric ring 51. In the present embodiment the metal ring is a reinforcement ring 48. The sealing ring 17 is force-fitly fixed to the trunnion. The reinforcement rings are preferably made out of a metallic material but non-metallic materials as well as combinations of both are optional solutions. The elastomeric rings are preferably made out of non-metallic materials like rubber or thermoplastic elastomers. Metallic materials like sinter materials or combinations of metallic and non-metallic materials are optional solutions as well.

The first elastomeric ring 50 comprises two sealing lips 18, 20 which essentially extend in a radial direction and abut against the trunnion 10. A first sealing lip 24 of the second elastomeric ring 51 extends mainly in the radial direction and abuts against the reinforcement ring 48. Moreover, a second sealing lip 22 of the second elastomeric ring extends mainly in an axial direction 28 and abuts against the cup 12. In a section along the axial direction 28 the metal ring 49 is U-shaped. The second sealing ring 17 is force-fitly fixed to the trunnion 10.

The sealing is suitable for heavy contamination environment applications. The sealing ring 17 protects from heavy mud and contamination with the help of the two sealing lips 22, 24 which are flexible in their design. The sealing ring 16 protects against contamination in worst environmental conditions. The sealing lips 18, 20 are more flexible than the sealing lips 22, 24 and thus cause less friction. The design of the sealing lips leads to a higher life time of the sealing 15 and a higher life time of the universal joint bearing arrangement.

Alternative embodiments are shown in FIGS. 5 to 9. Essentially the same components, features and functions are always given the same reference numerals. However, in order to differentiate the exemplary embodiments, the letters "a", "b", etc. are added to the reference numerals of the exemplary embodiments in FIGS. 5 to 9. The following description is essentially limited to the differences from the exemplary embodiment in FIGS. 1 to 4, wherein references can be made to the description of the exemplary embodiment in FIGS. 1 to 4 with respect to the components, features and functions which remain the same.

Figure 5:
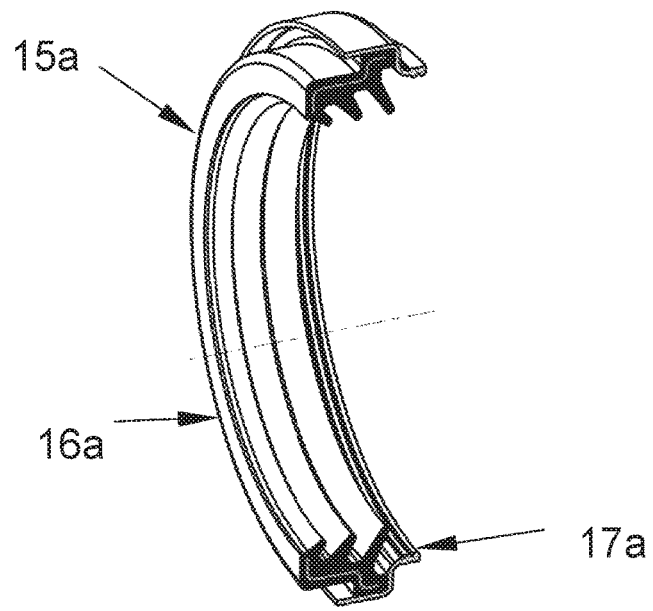
FIG. 5 presents a section through a sealing of a second universal joint bearing according to the invention.
Figure 6:
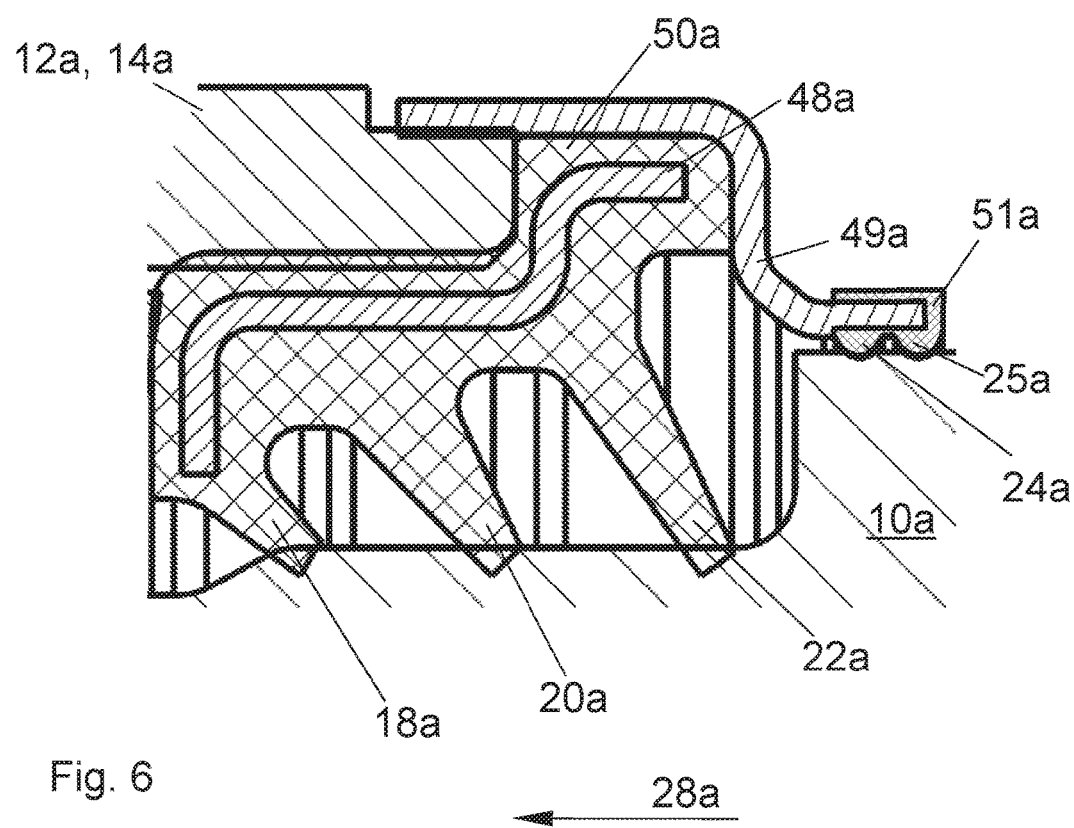
FIG. 6 presents a part of a section through the second universal joint bearing and a trunnion.

The universal joint bearing according to the embodiment in the FIGS. 5 and 6 comprises a metal ring 49a which is directly fixed to the cup 12. A second elastomeric ring 51a is molded to the metal ring. The second elastomeric ring comprises two sealing lips 24a and 25a which both abut against the trunnion. Furthermore, the first elastomeric ring 50a comprises three sealing lips 18a, 20a, 22a which all abut against a trunnion 10a firmly. The elastomeric ring 50a is protected by the metal ring 49a which gives rise to a higher lifetime of the sealing 15a. The sealing ring 16a is quite stable under shock loads because of an interference fit with the cup 12 and its axial position relative to the metal ring.

Figure 7:
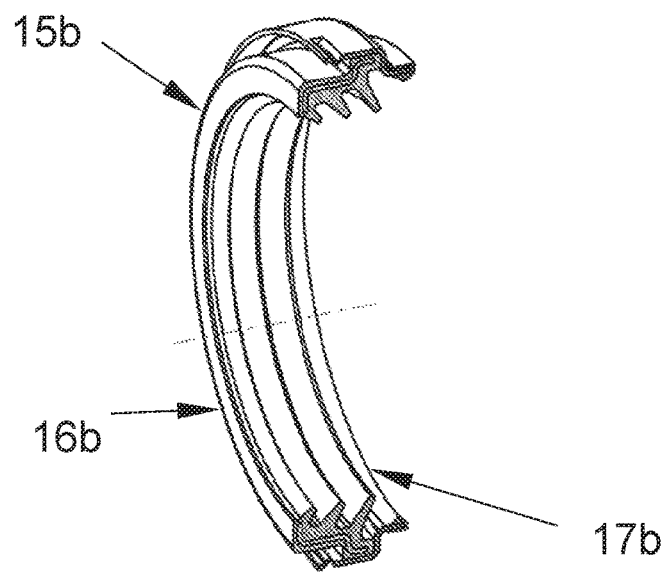
FIG. 7 presents a section through a sealing of a further embodiment of a universal joint bearing.
Figure 8:
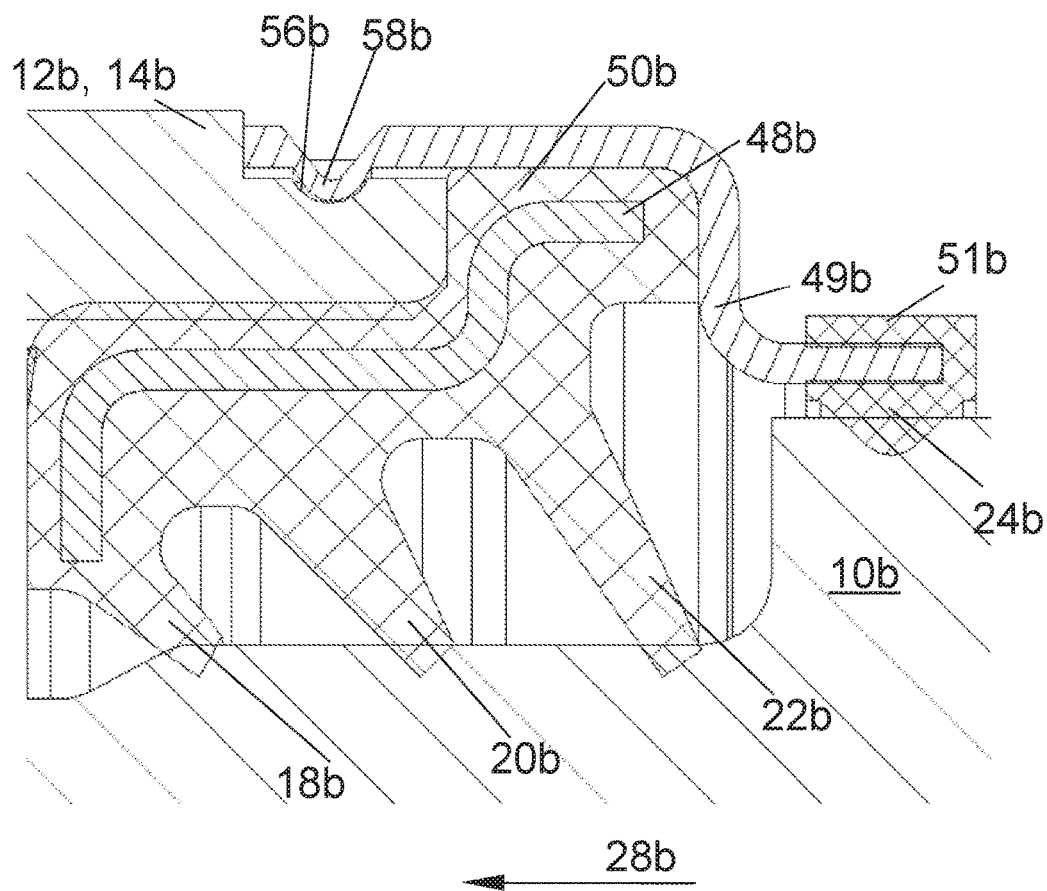
FIG. 8 presents a part of a section through the universal joint bearing of the further embodiment of FIG. 7 and a trunnion.

The embodiment in the FIGS. 7 and 8 has only 2 differences compared to the embodiment in the FIGS. 5 and 6. The first difference is that the elastomeric ring 51b has only one sealing lip 24b. The second difference is that the metal ring 49b is form-fitly fixed to the cup 12b. For this the metal ring comprises tongues 58b which extend into grooves 56b of a radial outer surface of the cup 12b.

Figure 9:
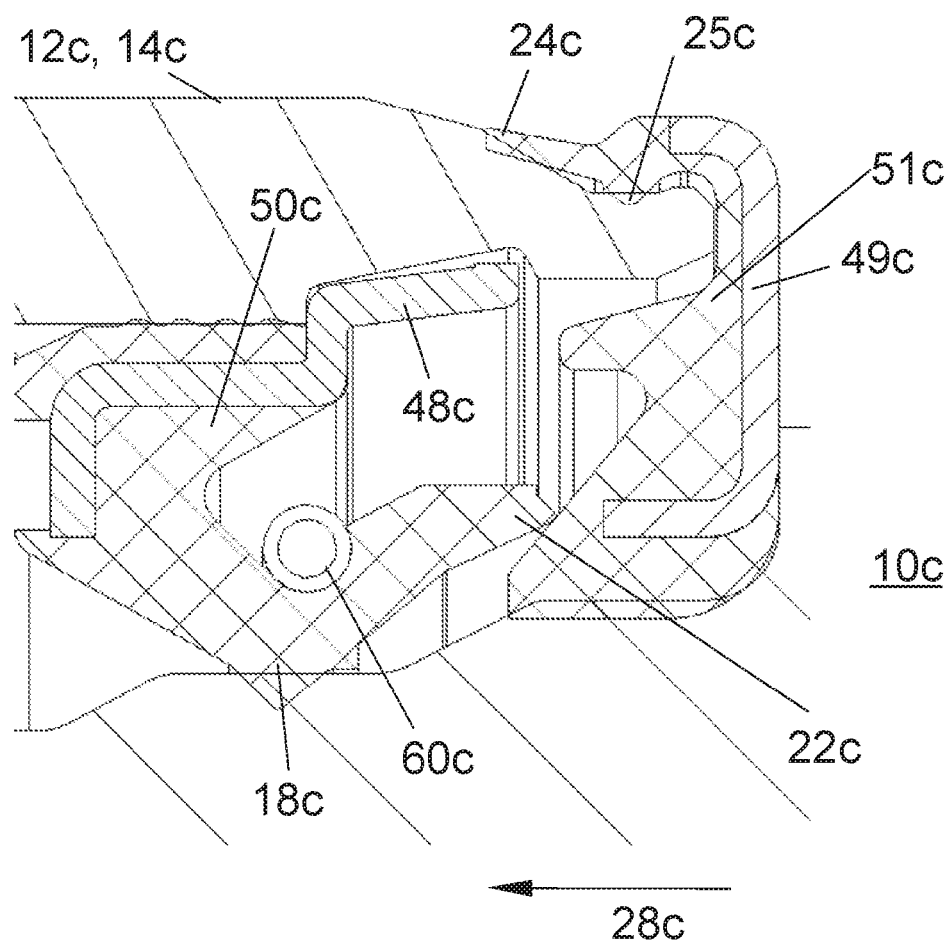
FIG. 9 presents a section through a further embodiment of a universal joint bearing and a trunnion.

FIG. 9 shows a further embodiment comprising a spiral spring 60c which pushes a first sealing lip 18c of a first sealing ring 50c against a trunnion 10c. The universal joint bearing of the embodiment possess a second sealing ring with two sealing lips 24c, 25c which abut against a radially outer surface of the cup 12c of the universal joint bearing. The sealing lip 24c extends mainly in an axial direction 28c. The sealing lip 25c extends mainly radially inwardly.

REFERENCE NUMERALS

Ref No. Description
10 trunnion
12 cup
14 outer ring
15 sealing
16 sealing ring
17 sealing ring
18 sealing lip
20 sealing lip
22 sealing lip
24 sealing lip
25 sealing lip
26 bottom
28 axial direction
34 propeller shaft
36 motor vehicle
38 universal joint bearing
40 universal joint
48 reinforcement ring
49 metal ring
50 elastomeric ring
51 elastomeric ring
54 crosspiece
56 groove
58 tongue
60 spiral spring

What is claimed is:

1. A universal joint bearing with at least a first elastomeric ring and a second elastomeric ring, the universal joint bearing comprising:
   being free from spiral springs, which exert a force on a portion of one of the first elastomeric ring and the second elastomeric ring,
   wherein the first elastomeric ring is force fitly fixed directly to an interior surface of the cup,
   wherein the portion of one of the first elastomeric ring and the second elastomeric ring is provided for abutting against a trunnion of a crosspiece of a universal joint in a condition in which the universal joint bearing is part of the universal joint.

2. The universal joint bearing according to claim 1, the first elastomeric ring further comprising at least two sealing lips.

3. The universal joint bearing according to claim 1, one of the first elastomeric ring and the second elastomeric ring further comprising a sealing lip that abuts against a cup of the universal joint bearing.

4. The universal joint bearing according to claim 1, one of the first elastomeric ring and the second elastomeric ring further comprising at least one sealing lip that extends mainly in an axial direction.

5. The universal joint bearing according to claim 1, the universal joint bearing further comprising at least one metal ring that is directly fixed to the cup.

6. The universal joint bearing according to claim 5, wherein the second elastomeric ring is fixed to the metal ring and provided for abutting against the trunnion in the condition in which the universal joint bearing is part of the universal joint.

7. The universal joint bearing arrangement according to claim 5, the universal joint bearing arrangement further comprising the trunnion, wherein a gap between the cup of the universal joint bearing and the trunnion is sealed with a sealing that is free from the spiral springs.

8. The universal joint bearing according to claim 1, the first elastomeric ring further comprising at least three sealing lips.

9. A universal joint bearing having at least a first elastomeric ring and a second elastomeric ring and a cup, the universal joint bearing comprising:
   the first elastomeric ring including a sealing lip that abuts against the cup, and
   the first elastomeric ring further comprising a second sealing lip that also abuts against the cup,
   wherein the first elastomeric ring is force fitly fixed directly to an interior surface of the cup.

10. The universal joint bearing with at least the first elastomeric ring and the second elastomeric ring and the cup according to claim 9, one of the first elastomeric ring or the second elastomeric ring further comprising at least two sealing lips that abut against the cup on a radially outer surface of the cup.

* * * * *